May 27, 1930.  G. O. TUSTING  1,760,452
LUGGAGE CARRIER
Filed April 1, 1929
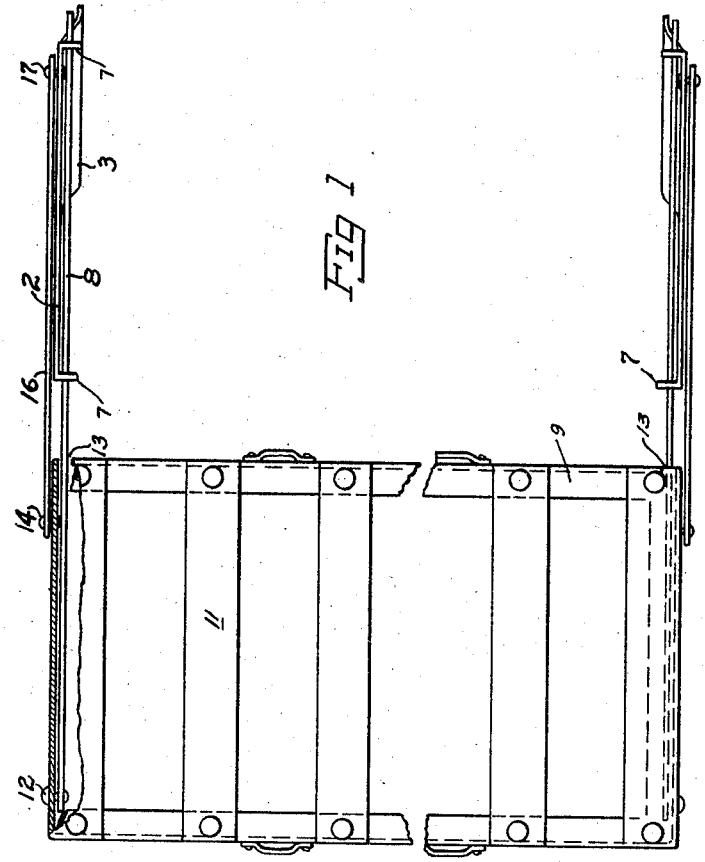
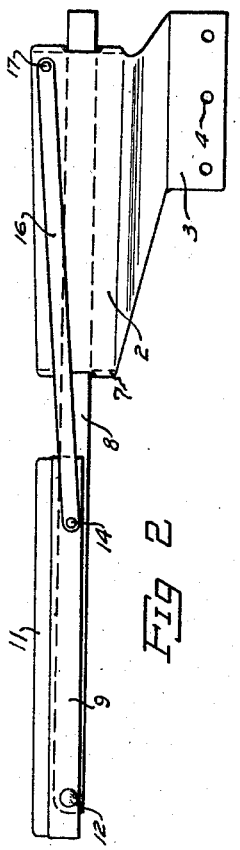
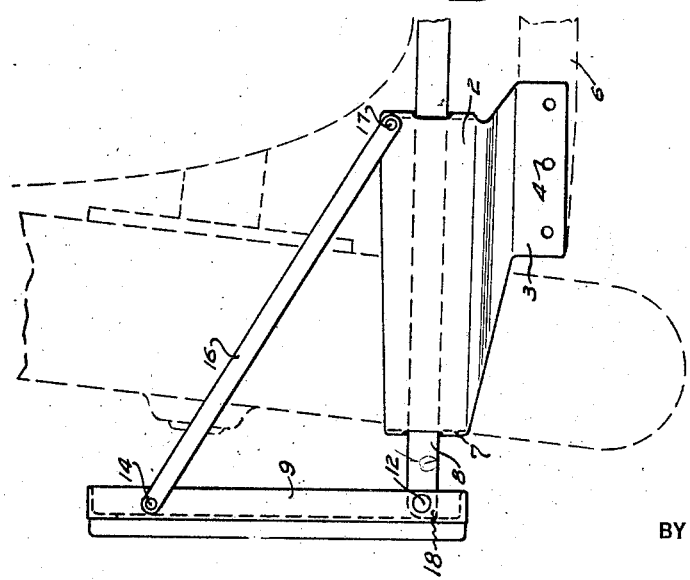
INVENTOR
GOODWIN O. TUSTING.
BY Charles S. Evans
ATTORNEY Patented May 27, 1930

1,760,452

UNITED STATES PATENT OFFICE

GOODWIN O. TUSTING, OF ALAMEDA, CALIFORNIA

LUGGAGE CARRIER

Application filed April 1, 1929. Serial No. 351,484.

My invention relates to luggage carriers, and particularly to a device of this character which is adapted to be mounted at the rear end of an automobile.

The chief object of my invention is the provision of a luggage carrier which is readily mounted upon the rear ends of the chassis frame of an automobile and which may be folded up against the spare tire when not in use.

Another object of the invention is the provision of a luggage carrier of sturdy, simple construction, which lends itself to low cost production.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a plan view of the luggage carrier in the position of use; and Figure 2 is a side elevation thereof.

Figure 3 is a side elevation of the luggage carrier in the retracted or folded position. The end of the chassis frame and the spare tire are shown in dotted lines.

In terms of broad inclusion, the luggage carrier of my invention comprises a pair of brackets suitably secured at the rear ends of the chassis and each forming a slideway for a bar. The bar, at its outer end, is pivoted to the platform on which the luggage may be strapped or otherwise suitably secured. Adjacent the near edge of the platform is pivoted a link, the other end of which is pivoted to the bracket. This construction provides for the platform a stable support upon the slide bars in the extended position of use, while permitting movement to the substantially vertical position of disuse. The platform is moved from the position of use to the position of disuse by raising the near edge, that is, the edge nearest the automobile, and pushing the whole backwardly on its slides.

In terms of greater detail, my luggage carrier comprises a pair of brackets, each of which comprises a plate 2 having an inwardly and downwardly projecting flange 3 provided with bolt holes 4 through which the securing bolts on the chassis 6 pass. Lock washers and nuts on the ends of the bolts secure the flanges snugly against the outside surface of the frame ends, leaving the inside surface of each plate 2 spaced a short distance outwardly from the frame end.

At each end, the plate is provided with an inwardly turned flange 7; and these flanges are apertured to form a slideway for the slide bar 8 which provides the chief support for the platform of the luggage carrier. The platform comprises a rectangular frame 9 preferably formed of light angle iron and connected across the top with slats 11. The outer end of each slide bar 8 is connected to the end member of the platform on the inside adjacent the rear edge by the pivot pin 12; and in the position of use, as shown in Figs. 1 and 2, the platform rests upon the two slide bars, a notch 13 being cut in the lower edge of the inner frame member to permit the platform to lie flat on the bars. Pivoted on the outside of each end member of the platform adjacent the near edge by the pin 14 is a link 16, pivoted by the pin 17 at its other end to the outer face of the bracket adjacent its inner end. These links provide a support for the upper end of the platform when it is raised into the position shown in Fig. 3, in which position the square end 18 of the slide bar 8, engages the platform frame to prevent further inward movement.

It will be noted that in the position of use shown in Figs. 1 and 2, all the parts are in equilibrium and the platform provides a stable support for its load, which is carried on the slide bars. In this position the links 16 prevent movement of the platform slides, the pivot pin 14 being slightly below a line connecting the pivot pins 12 and 17.

From the position of use in a substantially horizontal plane, the near side of the platform, that is, the side nearest the automobile, may be raised and the whole pushed inwardly to a substantially vertical position, as shown in Fig. 3. It is found that the weight of the parts and the frictional resistance between the moving parts tends to retain the platform in the retracted or raised position. Because of the offsetting of the flanges 3 from the plates 2, the slide bars 8 may be arranged on the inside of the plate 2, between it and the frame of the automobile.

I claim:

1. A luggage carrier comprising a platform, a bracket adapted to be fixed on the frame of a vehicle, a link pivoted to the platform at on end and to the bracket at the other end, and a bar slidably mounted in the bracket and pivoted to the platform.

2. A luggage carrier for a vehicle comprising a platform, a pair of brackets adapted to be fixed on the frame of the vehicle, a bar slidably mounted in each of said brackets and pivoted to the platform adjacent one edge thereof, and a link pivoted to each of said brackets and pivoted to the platform adjacent the opposite edge thereof.

3. A luggage carrier for a vehicle and adapted to be moved from a substantially horizontal position to a substantially vertical position and vice versa comprising a platform, a pair of brackets adapted to be fixed to the frame of said vehicle, a bar slidably mounted in each bracket and pivoted to the platform adjacent the remote edge in its horizontal position, and a link pivoted to each bracket and to the platform adjacent its near edge in its horizontal position.

4. A luggage carrier for a vehicle and adapted to be moved from a substantially horizontal position to a substantially vertical position and vice versa comprising a platform, a pair of brackets adapted to be fixed to the frame of said vehicle, a bar slidably mounted in each bracket and pivoted to the platform, and a link pivoted to the remote portion of each bracket and to the near edge of the platform in its horizontal position.

5. A luggage carrier comprising a platform, a bracket adapted to be fixed to the frame of a vehicle and having inwardly turned and apertured flanges, a link pivoted to the platform at one end and to the bracket at the other end, and a bar slidably mounted in said flanges and pivoted to the platform.

6. A luggage carrier for an automobile comprising a platform, a bracket having an offset portion adapted to be fixed to the frame of said automobile, a bar slidably mounted in said bracket, and a link pivoted to the platform at one end and to the bracket at the other end.

7. A luggage carrier for an automobile comprising a platform, a bracket having an offset portion adapted to engage the frame of said automobile and space the bracket from said frame, a bar pivoted to the platform and slidably mounted in said bracket and adapted to lie at the side of the frame, and a link pivoted to the platform at one end and to the bracket at the other end.

8. A luggage carrier for an automobile comprising a platform, a bracket having inwardly turned and apertured flanges and an offset portion adapted to engage the frame of said automobile and space the bracket from said frame, a bar pivoted to the platform and slidably mounted in said apertured flanges and adapted to lie at the side of the frame, and a link pivoted to the platform at one end and to the bracket at the other end.

In testimony whereof, I have hereunto set my hand.

GOODWIN O. TUSTING.